United States Patent [19]

Sauers

[11] 4,219,211
[45] Aug. 26, 1980

[54] TRAILER CONNECTION MEANS
[76] Inventor: Leon P. Sauers, 2559 Barton St. E., Hamilton, Ontario, Canada
[21] Appl. No.: 972,329
[22] Filed: Dec. 22, 1978
[51] Int. Cl.² .............................................. B62D 53/06
[52] U.S. Cl. ............................... 280/425 A; 280/423 B
[58] Field of Search .......................... 280/425 A, 423 B
[56] References Cited
U.S. PATENT DOCUMENTS

| | | | |
|---|---|---|---|
| 2,967,720 | 1/1961 | Smith et al. | 280/425 A |
| 3,215,449 | 11/1965 | Talbert | 280/425 A |
| 3,536,340 | 10/1970 | Talbert | 280/425 A |

Primary Examiner—John J. Love
Assistant Examiner—Donn McGiehan
Attorney, Agent, or Firm—Hirons, Rogers & Scott

[57] ABSTRACT

A gooseneck for connecting a tractor with a trailer adapted to transport heavy loads comprises an upstanding generally vertical section adapted to be releasably secured to the front of the trailer, and forwardly extending generally horizontal beam adapted to be connected to the fifth wheel of the tractor, the beam being pivotally connected to the upstanding section for pivoting about a transverse axis. The upstanding section of the gooseneck is equipped with pneumatic air bags, which bear against the rear end of the beam of the gooseneck. In response to pneumatic pressures supplied to the air bags, the rear end of the gooseneck can be raised, thereby adjusting the overall vertical height of the gooseneck and the height of the trailer above the roadway. Pneumatic pressure is supplied by the air brake system of the tractor. The horizontal beam and upstanding sections of the gooseneck can be locked together in one of several relative positions.

9 Claims, 6 Drawing Figures

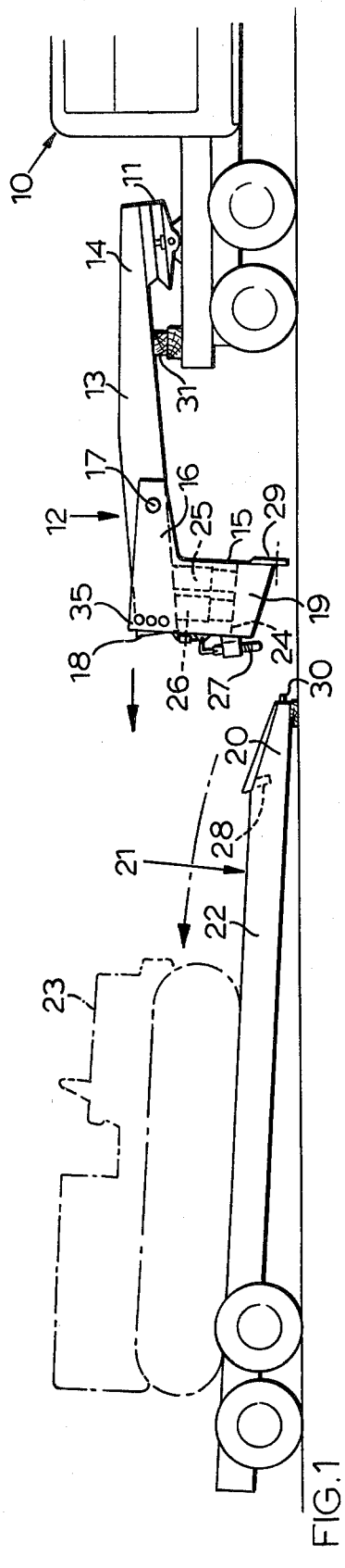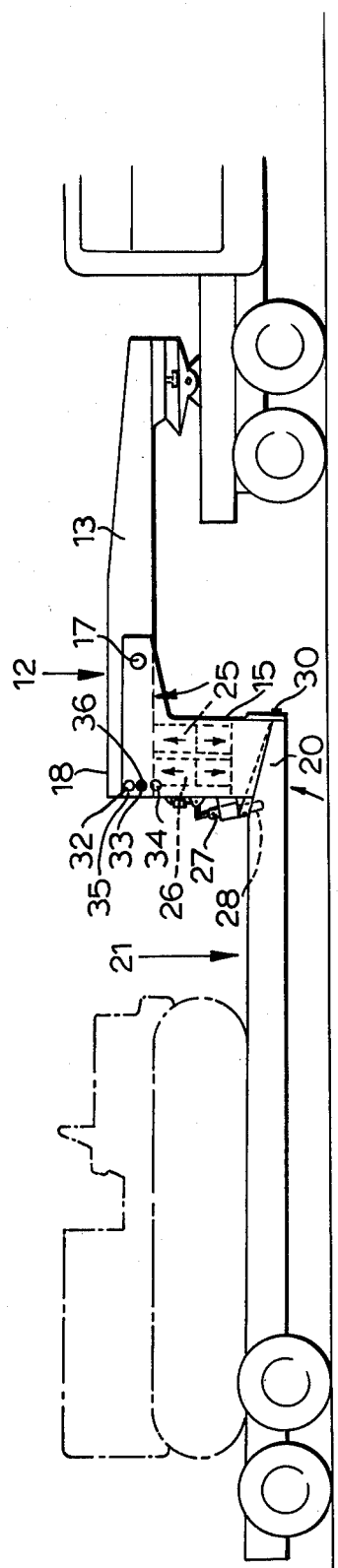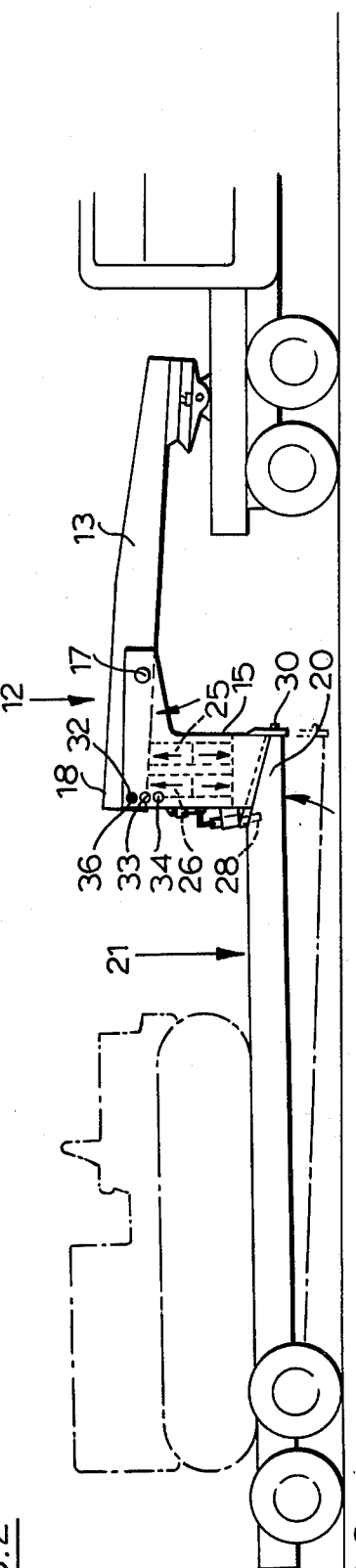

TRAILER CONNECTION MEANS

FIELD OF THE INVENTION

This invention relates to transportation vehicles and components therefor, more particularly to extra heavy duty tractor-trailer rigs for the transportation by road of heavy specialty items, for example construction equipment such as bulldozers, requiring ground level loading.

BACKGROUND OF THE INVENTION

Such tractor trailer combinations generally comprise a trailer having a depressed flat loading platform and rear wheels, usually two or three tandem pairs; a tractor bearing the usual driving features and power sources and a fifth wheel; and a connection means known as a gooseneck connecting the tractor with the trailer. The connection means usually comprises an upstanding, generally vertical section adapted to be releasably secured to the front portion of the trailer and a generally horizontal beam secured to the top part of the upstanding section and extending forwardly to connect in articulated manner with the fifth wheel of the tractor. The upright section and generally horizontal beam connection means, because of the shape in side elevation, is commonly referred to as a gooseneck.

Since the tasks which such tractor-trailer rigs are called upon to perform are of a specialized, non-standard nature, it is of advantage to have a variety of different tractors, trailers and goosenecks available, all of which are interfitting with and detachable from one another. Accordingly, a tractor-trailer rig can be built according to the task it is to perform by selection of suitably sized components.

To load or unload heavy equipment such as a bulldozer from the trailer platform, it is necessary both to lower the trailer platform as close to the ground as possible, and to remove the gooseneck from the trailer. The power required for removal of the gooseneck from the trailer is normally derived from the tractor, or from self-contained power equipment on the gooseneck itself. In many instances the gooseneck has to be removed for loading or unloading cargo from the trailer in remote areas where other power sources and equipment are not conveniently available.

BRIEF DESCRIPTION OF THE PRIOR ART

It is known to provide a tractor equipped with a power operated winch which can be used for removing the gooseneck from the trailer. This is undesirable, since it calls for the provision of a specialized tractor having equipment not useful in other functions in which it is desired to employ the same tractor. It is also known to provide a tractor with hydraulic power equipment and a gooseneck with hydraulic system so that the gooseneck can be removed hydraulically. Again, however, this detracts from the versatility of the tractor by requiring it to carry equipment not useful in other applications for the tractor.

It is also known to provide the trailer and gooseneck with its own power equipment for removal of the gooseneck. This requires the provision of large amounts of equipment on the trailer, including a gasoline engine, starter, battery and hydraulic equipment such as pumps, hydraulic cylinders, etc., and has several drawbacks. Firstly it is important to keep the weight of the trailer as low as possible so that the payload it can carry may be as high as possible. Secondly, all added power equipment brings with it a substantial requirement for maintenance. Thirdly, such power equipment is often difficult to start up, when the rig is being operated at low temperatures and at remote locations.

SUMMARY OF THE PRESENT INVENTION

The present invention provides a gooseneck adapted to be releasably secured to a trailer and to a tractor, which is equipped with pneumatic means operable to adjust the gooseneck and trailer positions for attachment and removal of the gooseneck from the trailer. The pneumatic means on the gooseneck is adapted to be connected to the pneumatic power means of the tractor, such as the air brake compresser with which all tractors capable of pulling the type of load such trailers are to handle, are equipped.

Thus according to the present invention there is provided a gooseneck for connecting a tractor and a trailer for transportation, said gooseneck comprising:

a first section adapted to be releasably secured in rigid fashion to the front of a trailer;

a second section adapted to be pivotally connected to a tractor;

means connecting the first section of the gooseneck and the second section of the gooseneck in a manner permitting adjustment of the overall vertical height of the gooseneck and the level of the front of a trailer secured thereto;

pneumatic means carried by the gooseneck adapted to adjust the vertical height of the gooseneck and the level of the front of the trailer secured thereto in response to pneumatic pressure supplied to said pneumatic means.

DESCRIPTION OF THE PREFERRED EMBODIMENTS

According to a preferred embodiment of the invention, the first section of the gooseneck comprises an upright section and the second section of the gooseneck comprises a forwardly extending generally horizontal beam which at its forward end is adapted to be pivotally connected to the fifth wheel of the tractor. The upright section has a main upstanding portion and an upper forwardly projecting part. The means connecting the first and second sections of the gooseneck comprises a pivotal connection of the forwardly projecting integral portion of the first, upright section and the generally horizontal beam, about a generally horizontal transverse axis, with the beam extending rearwardly from the pivotal connection to a position vertically above the main portion of the first, upright section. The pneumatic means is carried by the main portion of the upright section and bears against the underside of the beam at a position rearwardly of the pivotal connection of the gooseneck sections. Thus the rearward end of the beam can be raised and lowered with respect to the lower part of the upright section, by varying the pneumatic pressure supplied to the pneumatic means, so as to vary the overall height of the gooseneck.

As a result of such adjustment, the height of the trailer platform above the ground is also adjusted, since the lower part of the upright section is rigidly attached to the front of the trailer. Raising the rearward end of the beam in response to supplying pressure to the pneumatic means causes not only upward pivoting of the rearward end of the beam about the pivotal connection of the beam and the forwardly projecting part of the upright section, but also causes the pivotal connection to raise and consequently causes raising of the whole gooseneck and associated front end of the trailer.

Preferably, means are provided for locking the vertical position of the rearward end of the generally horizontal beam at the present height with respect to the main portion of the upright section. Thus the height of the trailer above the ground can be adjusted and locked so that it may be driven in positions giving different ground clearances and different headrooms.

In the most preferred form of the invention, the pneumatic means comprises a plurality of air bags supported at their lower ends on a platform rigidly secured to the upright section of the gooseneck, and adapted to be supplied with air pressure from the air brake system of the tractor via the intermediary of at least one air reserve storage tanks carried by the gooseneck. At their upper ends, the air bags bear against a plate forming part of the generally horizontal beam of the gooseneck and connected thereto by a pivotal connection allowing limited angular adjustment between the plate and the beam. This allows for variations in the angle of the rearward end of the beam caused by its pivoting movement in response to adjustments of the pressure of the air bags.

The invention thus provides a gooseneck which can be raised and lowered along with the trailer, for removal from the trailer by pneumatic pressure supplied from the air brake system of the tractor. It also provides a gooseneck which permits the trailer to be driven at a variety of different roadway clearances. No special equipment needs to be carried by the tractor in order to permit it to fulfill these functions. The pneumatic equipment required to be carried by the gooseneck is relatively light in weight, and does not require extensive maintenance.

REFERENCE TO THE DRAWINGS

FIG. 1 shows diagrammatically in side elevation a tractor having connected thereto a gooseneck according to the invention, about to be secured to the front end of a trailer carrying a heavy load;

FIG. 2 is a similar view to FIG. 1, showing the same apparatus assembled and ready for driving;

FIG. 3 is a similar view to FIG. 2, showing the gooseneck adjusted to a different vertical height;

In the drawings, like reference numerals indicate like parts.

DETAILED DESCRIPTION OF THE SPECIFIC PREFERRED EMBODIMENT

Figure 4:
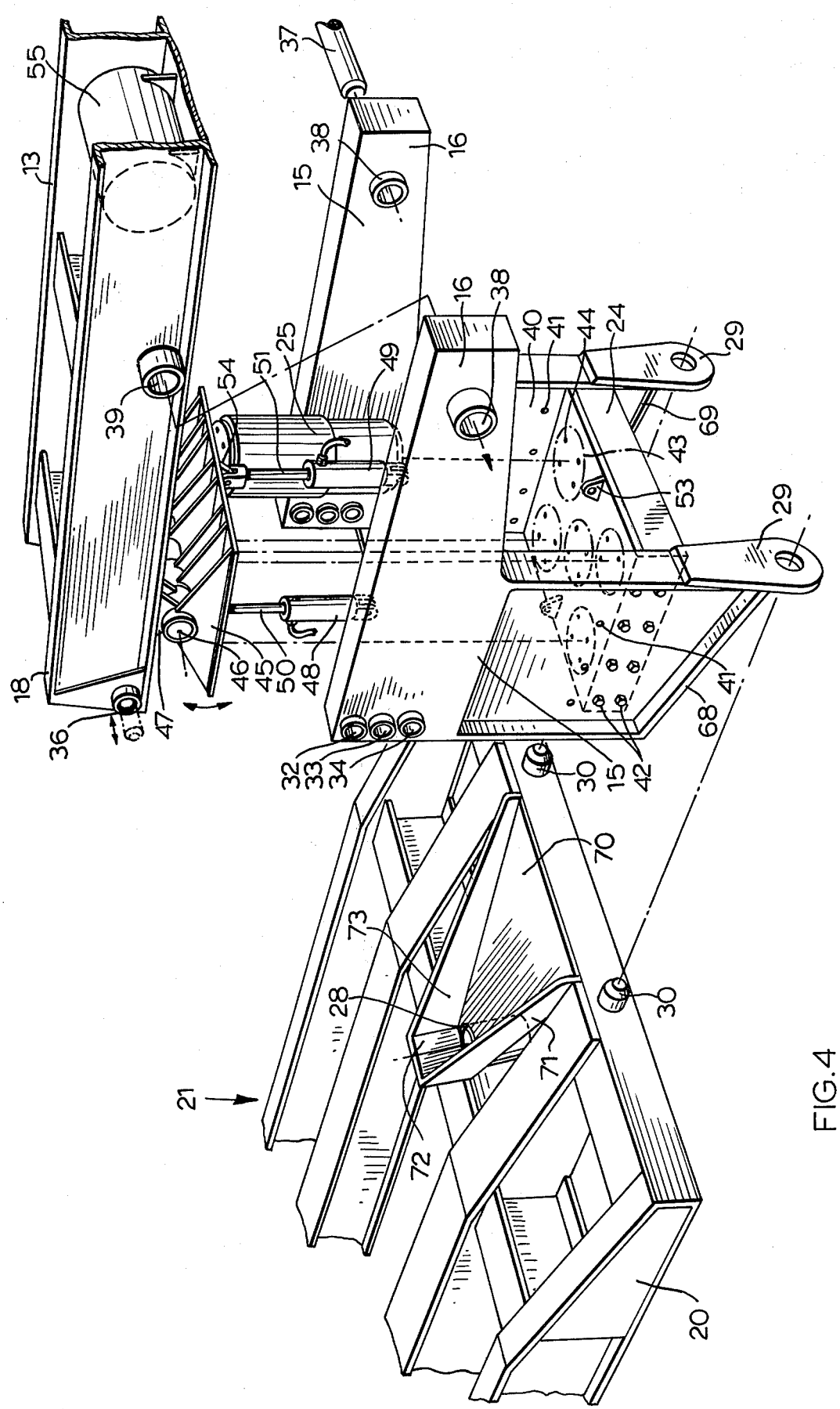
FIG. 4 is an exploded perspective view, with parts cut away, of a gooseneck according to the invention in association with the front end of a trailer to which it is to be assembled.

With reference to FIG. 1, there is shown a tractor 10 of generally conventional form having a fifth wheel 11. A gooseneck 12 is connected to the fifth wheel 11 in releasable manner to provide an articulated connection between the tractor 10 and the gooseneck 12. The gooseneck 12 comprises a forwardly extending generally horizontal beam 13, the forward end 14 of which connects to the fifth wheel 11, and an upright section 15 having an upper integral forwardly projecting part 16. The beam 13 is pivotally connected at 17 to the forward part 16 of the upright section, to allow pivoting about a generally horizontal transverse axis of the beam 13 relative to the upright section 15. The rearward end 18 of the beam 13 extends a substantial distance rearwardly of the pivotal connection 17 to a position vertically above the main portion of the upright section 15.

The lower or main part 19 of the upright section 15 is adapted to be connected to the front end 20 of a trailer 21 by means described hereinafter. The trailer 21 has a large generally flat depressed platform 22 and is adapted to carry very heavy loads such as a bulldozer 23, or other crawler type equipment.

The main part of the upright section 15 carries a platform 24 rigidly secured thereto, having mounted thereon a plurality of air bags 25, 26 connected by suitable means to the air brake system of tractor 10. At their upper ends, the air bags 25, 26 bear against structure connected to the underside of the rearward end 18 of the generally horizontal beam 13 of the gooseneck 12.

The means for connecting the gooseneck 12 to the front end 20 of the trailer 21 comprises a downwardly projecting retractable pin 27 mounted on the rear face of the upright section 15 of the gooseneck 12, received in a complementary aperture 28 extending downwardly in the trailer 21. It also includes a downwardly projecting apertured plate 29 on the front surface of the lower portion 19 of the gooseneck upright section 15, in which is received a retractable pin 30 extending forwardly from the front end 20 of the trailer 21. These connection means are described in more detail below. However, in essence, as shown in FIG. 1, the gooseneck 12 is initially secured to the tractor 10 and kept clear of the trailer 21, so that the trailer rests on the ground and the bulldozer 23 is driven onto the trailer platform 22 over the front end 20 of the trailer 21. The gooseneck is meanwhile supported in a low position but clear of the ground by provision of support block 31 under the beam 13 on the rear of the tractor 10. The tractor 10 is then reversed as shown in FIG. 1, and the gooseneck connected to the trailer. Means for fine adjustment of the height of the gooseneck 12 to allow for the coupling to the trailer to be completed are provided, and hereinafter described.

With reference to FIG. 2, this shows the assembled rig, with the trailer 21 in an intermediate position i.e., with the trailer platform 21 generally horizontal. After coupling the gooseneck 12 to the front 20 of the trailer, the gooseneck 12 and trailer 21 are raised to the position shown in FIG. 2, by supplying air pressure to the air bags 25, 26. These inflate and expand, and push upwardly against the underside of the rearward end 18 of beam 13 of the gooseneck 12. The resultant raising of the end 18 causes the beam 13 to pivot about pivotal connection 17, and thus causes raising of the connection 17, gooseneck pedestal 15 and trailer front end 20.

Locking means in the form of a series of apertures 32, 33 and 34 near the upper rearward corner 35 of the upright section 15, and a cooperative retractable pin 36 near the end 18 of the beam 13 are provided. These serve to lock the position of the trailer 21 in the desired position for driving. Thus in adjusting the height of the trailer 21, air bags 25, 26 are inflated to raise the end 18 of the beam 13 of the gooseneck and consequently raise the trailer 21 to the desired level, and then the pin 36 is secured in the appropriate aperture, which for the position shown in FIG. 2 is the centre aperture 33.

As shown in full lines of FIG. 3, the trailer 21 can be raised to give greater ground clearance, by further inflating air bags 25, 26 further to cause further raising of beam 13. The apparatus can be locked in this higher position by securing pin 36 in the highest aperture 32 on the upright section 15. The apparatus can be locked in the lower position, shown in broken lines in FIG. 3, by deflating air bags 25, 26 to allow beam 13 to lower, and securing pin 36 in the lowest aperture 34 on the upright section 15, thereby giving smaller ground clearance of the front end 20 of trailer 21, but correspondingly increased head room.

It will be appreciated that upright section 15 of the gooseneck effectively consists of two similar side-by-side structures, there being a corresponding structure located at the other side of the rig, and not therefore illustrated in FIGS. 1, 2 and 3. Both of these similar structures can be seen in FIG. 4. The beam 12 is received between the upright structures 15, and a plurality of air bags 25, 26 are provided. The upright structures 15 are each provided with apertures 32, 33, 34 in alignment, and a retractable pin 36 protrudes from each side of the generally horizontal beam 13 near its rearward end 18.

If desired, the rig can be used without locking the position of the beam 13 and pedestal 15, i.e., with pins 36 in their retracted positions. This will allow the air bags 25, 26 to support the beam 13, and provide a cushioning or air ride effect for the trailer 21. This is advantageous where delicate loads for example transformer and computer equipment, need to be transported.

With reference to FIG. 4, this shows the gooseneck and front end of the trailer in exploded perspective, and with parts cut away. The generally horizontal beam 13 of the gooseneck 12 is received between two essentially similar side structures constituting upright section 15, with space between them to receive other structural components. The beam 13 is pivotally connected to the upper forwardly projecting part 16 of the pedestal 15 by means of a pivot pin 37 arranged to pass through aligned apertures 38 in the upper parts 16 of the upright section and apertures 39 in the generally horizontal beam 13 side members. As illustrated, beam 13 is of channel form. The rearward end 18 of the beam 13 is provided with retractable pins 36 arranged to be received in one of the apertures 32, 33, 34 in the sides of the upright section 15, as described previously.

The upright section 15 is provided on each of its side members with downwardly projecting forwardly presented apertured plates 29 each adapted to receive a retractable pin 30 on the front end of the trailer when assembled. The upright section 15 is also provided with side plates 40, one of which has been removed in FIG. 4, for clarity of illustration, the side plates 40 being integral with the pedestal 15. The side plates have three rows of bolt holes 41, the rows arranged one above the other. A platform 24 is provided which extends between the side plates 40. The platform 24 has two rows of bolt holes 42 on each side thereof, so that it can be bolted to the side plates 40 horizontally at a selected horizontal level by selecting the appropriate bolt holes for cooperation, for rigid securing to the upright section 15.

The upper surface of the platform 24 is provided with circular formations 43 provided with securing means 44 in the form of bolt holes, for receiving and securing thereto the lower end of air bags such as 25. The air bags 25 are telescopic in nature, adapted to expand and contract longitudinally in response to pneumatic pressures supplied thereto. Provision is made on the upper surface of the platform 24 for securing thereto up to five such air bags in upright positions.

The rearward end 18 of the generally horizontal beam 13, which fits between the sides of the upright section 15 of the gooseneck, carries on its lower surface a plate 45 presented downwardly towards the upper surface of platform 24. The plate 45 has a generally planar lower face provided with mounting formations, to which the upper ends of air bags 25 are secured. The plate 45 is triangular in side view, with the apex presented upwardly and apertured to receive a transvese pivot pin 46. The pivot pin 46 passes through depending brackets 47 on the underside of generally horizontal beam 13, so that plate 45 is pivotally connected to beam 13 for limited angular movement.

There are also provided a pair of pneumatic cylinders 48 and 49 with associated pistons 50 and 51 adapted to be mounted in a vertical position between the platform 24 of the gooseneck upright section 15 and the plate 45 of the beam 13. The bottom ends of cylinders 48 and 49 are bifurcated and are mounted pivotally on apertured brackets 52 and 53 upstanding from the top surface of platform 24. The top ends of the associated pistons 50 and 51 are mounted pivotally on brackets such as 54 depending from the lower surface of the plate 45. The cylinders 48 and 49 are connected to a source of pneumatic pressure, such as the air brake system of the associated tractor 10, and can be used to raise and lower the upright section 15 and compress the air bags 25, to provide the necessary fine adjustment of the height of the gooseneck for attachment to the front 20 of the trailer 21.

The generally horizontal beam 13 of the gooseneck 12 carries, forwardly of the pivotal connection 17, a plurality of air pressure storage tanks such as 55, mounted within the channel of the beam 13. The storage tanks 55 are pressurized by connection to the air brake system of associated tractor 10. The tanks 55 in turn are connected to the air bags 25 and the cylinders 48 and 49 by suitable connecting means, valves and controls not shown, to allow adjustment of the height of the gooseneck 12, beam 13, and trailer 21.

Figure 5:
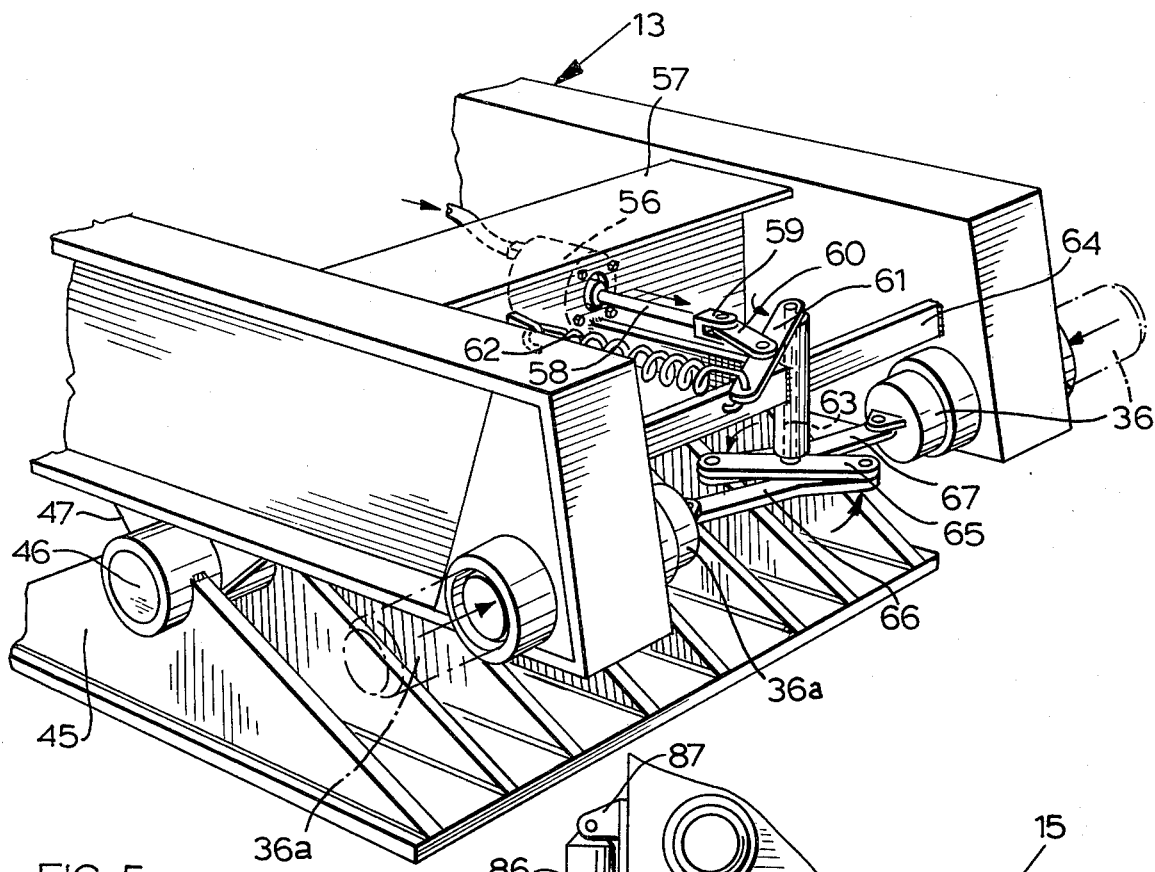
FIG. 5 is a perspective view of a detail of the upper part of a gooseneck of the present invention, showing the vertical height locking means.

With reference to FIG. 5, this shows in perspective a detail of the rear end of the generally horizontal beam 13, viewed from the opposite direction from that of FIG. 4. This illustrates the mechanism for projecting and retracting the locking pins 36 and 36a.

A pneumatic cylinder 56 is mounted on the rearmost cross member 57 of the beam 13, and is connected to a source of pneumatic pressure. A piston 58 is mounted in the cylinder 56 to be moved forwardly and rearwardly therefrom in response to pneumatic pressure in the cylinder 56. The rearward end 59 of the piston 58 is bifurcated, and is pivotally connected to a link 60. The link 60 is in turn pivotally connected to horizontally mounted connection plate 61, at approximately the midpoint thereof. The plate 61 is connected at one end by spring 62 to cross member 57 of the beam 13. The other end of plate 61 is mounted on the upper end of a vertical pivot pin 63, pivotally mounted in a transverse rod 64 extending between the side members of the beam 13.

Thus, as viewed in FIG. 5, spring 62 urges pivot pin 63 to rotate in a clockwise direction. Forward and rearward movement of piston 58 and associated link 60 will cause rotational movement of pin 63.

As its bottom end, pivot pin 63 is mounted on the top of a horizontally disposed link 65, at the approximate midpoint thereof, so that link 65 moves angularly in response to angular movement of pivot pin 63. Each end of link 65 is pivotally connected to the inner end of a respective arm 66, 67 pivotally connected to the end of the respective retractable locking pins 36a and 36. Thus by means of the mechanism described the retractable locking pins 36a and 36 can be moved inwardly and outwardly in response to pneumatic pressure supplied to the cylinder 56, which causes rearward movement of piston 58, angular movement of pivot pin 63 and consequent movement of retractable locking pins 36a and 36. The locking pins are spring urged to their extended locking positions by means of spring 62.

Figure 6:
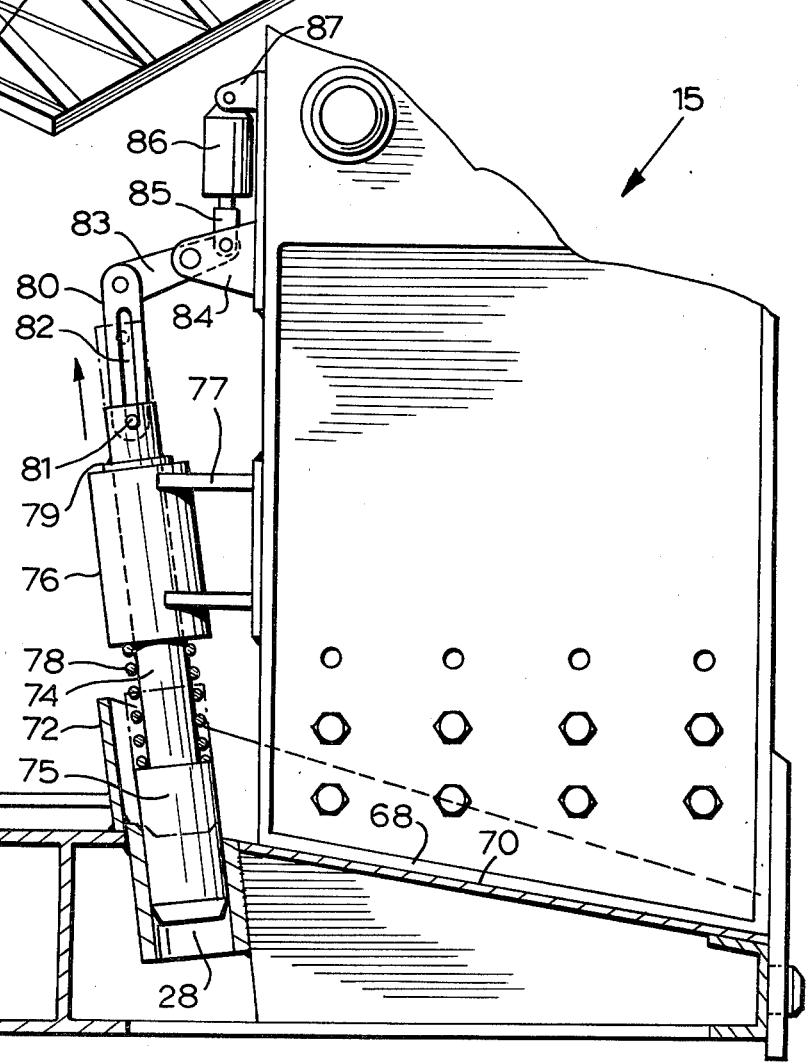
FIG. 6 is a side view partly in section of a detail of the lower part of the gooseneck of the present invention and associated trailer, showing the spring loaded locking and aligning pin and associated structure which assists in securing the gooseneck to the trailer.

The connection means for connecting the gooseneck to the front end of the trailer is shown in FIGS. 4, 5 and 6. The bottom surface of the upright section 15 of the gooseneck is constituted by two frame members 68 and 69 arranged at the correct angle to rest upon the sloping ramp portion of the front end 20 of the trailer 21. The front end 20 of the trailer 21 is provided at its centre with an inclined plane 70 of trapezoidal shape converging in a rearward direction, bounded by upstanding frame members 71, 72 and 73 to define a channel. At the rearward end of the channel 75 is located the downwardly extending aperture 28 previously referred to. This aperture 28 is generally circular in cross section, and is inclined forwardly in the downward direction as best shown in FIG. 6.

The retractable pin 27 mounted on the rear face of the gooseneck upright section 15 has a shank portion 74 and a head portion 75 at the lower end, the head portion 75 being circular in cross section and of a size to be received snugly in the aperture 28. The shank portion 74 is slidably received in a sleeve 76 rigidly secured to the rear face of the upright section 15 by means of brackets 77 thereon. A coil spring 78 surrounds the shank portion 74 of the pin 27, and bears at its upper end against the underside of the sleeve 76 and at its lower end against the top side of the head 75 so as to urge the pin 27 downwardly.

The upper end of the shank portion 74 of the pin 27 projects upwardly through the upper end of sleeve 76, and is provided with a fixed collar 79 which limits the extent of downward movement of the pin 27 by engaging with the top of the sleeve 76. The upper end of shank portion 74 is connected to a slotted link 80 by means of a pin 81 received in a vertically elongated slot 82 in the link 80. The upper end of link 80 is pivotally connected to one end of a fulcrumed lever 83 pivotally mounted near its mid-point on a bracket 84 secured to the rear of the upright section 15. The other end of the lever 83 is pivotally connected to the lower end of a piston 85 depending from a pneumatic cylinder 86 mounted on the rear face of upright section 15 by means of a bracket 87. The cylinder 86 is connected to a soure of pneumatic pressure, namely the air reserve tanks 55 on the gooseneck beam (FIG. 4) and hence to the air brake system of tractor 10, by conventional valve, tube and control means not shown. Thus when pneumatic pressure is supplied to cylinder 86 to cause lowering of piston 85, link 80 and shank portion 74 are raised, to lift head portion 74 of pin 27 clear of aperture 28. The pin and slot connection 81, 82 allows head portion 75 to be raised in response to upward force applied to the bottom of head portion 75, against the urging of spring 78.

In assembling the rig, the trailer 21 first rests with its front end on the ground, and is loaded over the front end. The gooseneck 12 is assembled with the fifth wheel 11 of the tractor 10, and the beam 13 is supported so that the bottom of the upright section 15 is clear of the ground. This is the position shown in FIG. 1. Now the trailer and gooseneck are driven in reverse. The apertured plates 29 are aligned and guided by lock pin 28 and channel members 71, 72 and 73, to coincide with the forwardly projecting pins 30. Fine adjustment of the height of the gooseneck is effected by adjusting air pressure supplied to small cylinders 48 and 49 (FIG. 4), to compress or expand air bags 25 as necessary. The bottom of pin 27 engages the top surface of plate 70 on the trailer, and as the tractor 10 is reversed further, the pin slides up the plate 70 and is pushed upwardly against the urging of spring 78, utilizing the lost motion provided by the pin and slot connection 81, 82. When the correct location is reached, the head 75 of retractable pin 27 drops into aperture 28 under urging of spring 78, to an extent limited by the engagement of collar 79 with the top of sleeve 76. The converging channel defined between frame members 71, 72 and 73 on the front end 20 of the trailer serves to guide the pin 27 into the aperture 28. At the same time, pins 30 are received projecting forwardly into apertures in plates 29, and the connection of the gooseneck to the trailer is complete.

Now the height of the trailer 21 above the road is adjusted to the desired position. This is achieved as previously described, by supplying pneumatic pressure to expand the air bags 25, 26 thereby raising the rear end 18 of the generally horizontal beam 13, pivot 17, upright section 15 and trailer end 20. This is performed with pneumatic cylinder 56 (FIG. 5) pressurized so that associated piston 58 is extended rearwardly, thereby rotating pivot pin 63 and causing retraction of the pins 36 and 36a. When the trailer has been raised to the desired level, and the pins 36, 36a are in alignment with the selected holes such as 33 on the pedestal of the gooseneck, the air pressure from cylinder 56 is released, so that the pins 36, 36a project outwardly under pressure of spring 62, to enter the selected holes such as 33 in the gooseneck upright section 15, and thereby lock the trailer and associated structure in the selected position. This is as shown in FIG. 2. The rig is now ready to be driven.

For unhitching the gooseneck from the trailer, for unloading purposes, the operations are essentially reversed. The retractable locking pins 36, 36a are retracted, by supplying pneumatic pressure to the cylinder 56. Then, the pneumatic pressure in the air bags 25, 26 is decreased so as to lower the trailer and associated structure until the front of the trailer rests upon the ground. The pin 27 is removed from the channel or aperture 28 by pressurizing pneumatic cylinder 86 (FIG. 6), so as to raise the pin clear of the top surface of the trapezoidal plate 70. Support blocks 31 are inserted between the bed of the tractor and the generally horizontal beam 13. Then the beam 13 and the gooseneck upright section 15 are raised, by pressurizing small cylinders 48, 49 (FIG. 4) so that the bottom of the pedestal is clear of the ground. The tractor can now be driven away, taking the associated gooseneck structure with it.

Thus as noted previously, locking pins 36 and 36a can be retained in their retracted positions whilst the rig is driven, to provide a cushioning or air ride effect for the load on the trailer. In addition, with locking pins 36 and 36a retracted, a measure of the weight of the trailer 21 and its load can be obtained by recording the pressure in air bags 25, 26 after suitable calibration on an air control valve gauge.

The gooseneck according to the present invention thus provides a number of advantageous features in practical use. The height of the load-carrying trailer can be adjusted as described, to provide increased ground clearance or increased headroom as required. This is achieved pneumatically, by providing on the gooseneck itself pneumatically operated adjustment means. For powering these pneumatic means, advantage is taken of standard power equipment provided on the tractor, such equipment in fact being mandatory on present day highway tractor units. The gooseneck does not have to be provided with its own power equipment, so that it is lighter in weight. Problems of cold weather starting and hydraulic fluid thinning previously encountered with hydraulically actuated goosenecks and those having their own power packs are avoided.

In addition, the gooseneck of the present invention provides the feature of an air cushion ride, if and when desired, for a delicate load, which is not available when using mechanically or hydraulically operated goosenecks.

Whilst a specific embodiment of the invention has been described and illustrated in detail, it will be appreciated that this is illustrative only, and that variation in structural design and component parts can be made without departing from the scope of the present invention, which is defined in the appended claims.

I claim:

1. A gooseneck for connecting a tractor and a trailer for transportation, said gooseneck comprising:
    a generally upright first section having a main upstanding portion adapted to be releasably secured in rigid fashion to the front of a trailer, and a forwardly projecting part;
    a second section in the form of a forwardly extending, generally horizontal beam, adapted to be pivotally connected to the fifth wheel of the tractor;
    a pivotal connection between the first section and the second section, said connection being disposed on the forwardly projecting part of the first section, and the generally horizontal beam extending rearwardly from said pivotal connection to a position vertically above the main upstanding portion of said first upright section;
    said pivotal connection connecting said first and second sections for pivotal movement therebetween about a generally horizontal axis, to permit adjustment of the overall vertical height of the gooseneck and the level of the front of a trailer secured thereto;
    pneumatic adjustment means carried by the gooseneck and adapted to adjust the vertical height of the gooseneck and the level of the trailer secured thereto in response to pneumatic pressure supplied to said pneumatic means.

2. The gooseneck of claim 1 wherein the pneumatic means is carried by the main upstanding portion of the upright section and bears against the underside of the generally horizontal beam at a position rearwardly of the pivotal connection of the first and second sections.

3. The gooseneck of claim 2 including locking means for locking the height of the rear end of the beam with respect to the upright section.

4. The gooseneck of claim 2 wherein the pneumatic means comprises a plurality of air bags longitudinally extendable in response to pneumatic pressure, secured at their lower ends to a platform rigidly secured to the upright section.

5. The gooseneck of claim 2 wherein the air bags at their upper ends bear against a plate pivotally connected to the underside of the rear end of the beam for limited angular movement therebetween.

6. The gooseneck of claim 4 wherein the beam carries at least one air pressure storage tank operatively associated with the air bags to supply pneumatic pressure thereto.

7. The gooseneck of claim 1 including locking and guiding means for correct alignment of gooseneck and trailer prior to connection together, and for releasably locking together.

8. The gooseneck of claim 7 wherein the locking and guiding means comprises a downwardly extending retractable pin on the upright section of the gooseneck, for reception in a guide channel and aperture on the front end of the trailer.

9. The gooseneck of claim 8 wherein the retractable pin is forwardly inclined and spring urged to its downward, locking position, pneumatic means being provided and connected to the retractable pin, operable to raise the pin to its unlocking position.

* * * * *